(12) United States Patent
Astely et al.

(10) Patent No.: US 9,002,387 B2
(45) Date of Patent: Apr. 7, 2015

(54) METHOD AND ARRANGEMENT IN A TELECOMMUNICATION NETWORK WITH INTERCELL INTERFERENCE COORDINATION

(75) Inventors: David Astely, Bromma (SE); Anders Furuskär, Stockholm (SE); Stefan Parkvall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 255 days.

(21) Appl. No.: 13/520,305
(22) PCT Filed: Jun. 17, 2010
(86) PCT No.: PCT/SE2010/050678
§ 371 (c)(1),
(2), (4) Date: Jul. 2, 2012
(87) PCT Pub. No.: WO2011/099908
PCT Pub. Date: Aug. 18, 2011

(65) Prior Publication Data
US 2012/0276937 A1 Nov. 1, 2012

Related U.S. Application Data
(60) Provisional application No. 61/303,869, filed on Feb. 12, 2010.

(51) Int. Cl.
H04B 7/00 (2006.01)
H04B 15/00 (2006.01)
H04W 72/08 (2009.01)
(52) U.S. Cl.
CPC .................... *H04W 72/082* (2013.01)
(58) Field of Classification Search
CPC ............ H04W 52/243; H04W 52/325; H04W 36/0083; H04W 52/241; H04W 72/04; H04W 72/082; H04W 52/244; H04W 52/245; H04W 52/281; H04W 72/0426; H04L 1/0026; H04B 2201/70702; H04B 17/0077; H04J 11/0026

USPC ............... 455/69, 70, 434, 127.1, 522, 63.1, 455/67.11, 423, 450, 509, 515, 436; 370/252, 329, 332, 315–320
See application file for complete search history.

(56) References Cited

U.S. PATENT DOCUMENTS 6,078,959 A * 6/2000 Wright et al. ................. 709/227
8,181,079 B2 * 5/2012 Gorokhov et al. ............ 714/748
(Continued)

FOREIGN PATENT DOCUMENTS

JP 10 271041 10/1998
JP 2005 278163 10/2005
(Continued)

OTHER PUBLICATIONS

International Search Report, International Application No. PCT/SE2010/050678, Nov. 2, 2010.
(Continued)

Primary Examiner — Sujatha Sharma
(74) Attorney, Agent, or Firm — Myers Bigel Sibley & Sajovec, P.A.

(57) ABSTRACT

Methods and arrangements in a telecommunication network for intercell interference coordination. The telecommunication network comprises a first base station, acting as serving base station for a mobile station, and a second base station. The method comprises determining that transmission interference to the mobile station is to be limited. The method also comprises triggering the mobile station to send a signal on a radio resource, which signal is to be received by the second base station, enabling the second base station to select a transmission parameter that limits interference for the mobile station.

18 Claims, 11 Drawing Sheets

(56) References Cited

U.S. PATENT DOCUMENTS

| | | | |
|---|---|---|---|
| 8,594,576 B2* | 11/2013 | Palanki | 455/63.1 |
| 8,630,267 B1* | 1/2014 | Jin | 370/332 |
| 2005/0201351 A1 | 9/2005 | Nakao | |
| 2008/0108377 A1 | 5/2008 | Yoon | |
| 2009/0093219 A1* | 4/2009 | Katada et al. | 455/69 |
| 2009/0197603 A1* | 8/2009 | Ji et al. | 455/436 |
| 2009/0197629 A1* | 8/2009 | Borran et al. | 455/522 |
| 2009/0245195 A1* | 10/2009 | Bhattad et al. | 370/329 |
| 2010/0008294 A1 | 1/2010 | Palanki et al. | |
| 2010/0099449 A1* | 4/2010 | Borran et al. | 455/501 |
| 2010/0267408 A1* | 10/2010 | Lee et al. | 455/509 |
| 2012/0086663 A1* | 4/2012 | Matsuo | 345/173 |

FOREIGN PATENT DOCUMENTS

| | | |
|---|---|---|
| WO | WO 2006/099547 A1 | 9/2006 |
| WO | WO 2009/054761 A1 | 4/2009 |
| WO | WO 2009/099472 A2 | 8/2009 |

OTHER PUBLICATIONS

Chen et al., "Interference Detection and Measurement in OFDMA Relay Networks", IEEE 802.16 Broadband Wireless Access Working Group, [Online], IEEEC802.16J-07/2229R1, pp. 1-16, XP002526746, retrieved Mar. 9, 2007 from the Internet: URL:http://wirelessman.org/relay/contrib/C80216j-07_229r1.pdf.

Written Opinion of the International Searching Authority, PCT/SE2010/050678, Nov. 2, 2010, 5 pages.

International Preliminary Report on Patentability, PCT/SE2010/050678, Aug. 14, 2012, 6 pages.

English Translation—Summary of Reason(s) for Refusal, JP Patent Application No. 2012-552834, 4 pages.

Summary of the Decision of Refusal for Japanese Patent Application; 1 Page, Mar. 20, 2014.

* cited by examiner

METHOD AND ARRANGEMENT IN A TELECOMMUNICATION NETWORK WITH INTERCELL INTERFERENCE COORDINATION

CROSS REFERENCE TO RELATED APPLICATION

This application is a 35 U.S.C. §371 national stage application of PCT International Application No. PCT/SE2010/050678, filed on 17 Jun. 2010, which itself claims priority to U.S. Provisional Application No. 61/303,869, filed 12 Feb. 2010, the disclosure and content of both of which is incorporated by reference herein in its entirety. The above-referenced PCT International Application was published in the English language as International Publication No. WO 2011/099908 A1 on 18 Aug. 2011.

TECHNICAL FIELD

The present invention relates to a method and arrangement in a first base station, a method and arrangement in a second base station and to a method and arrangement in a user equipment. In particular, the present invention relates to a mechanism for Intercell Interference Coordination (ICIC).

BACKGROUND

Intercell Interference Coordination (ICIC) aims at reducing the interference between cells in a cellular system. The basic principle is to, in the own cell, on a more or less dynamic basis refrain from using certain resources, on which 'sensitive' terminals are allocated in neighbouring cells. In principle, if the cost of the reduced resource usage in the own cell is regarded smaller than the gain from the reduced interference in the neighbour cells; a performance gain can be achieved. A good ICIC mechanism hence requires a minimum reduction in resource utilization for a large reduction of interference.

ICIC techniques comprises e.g. frequency and time reuse, power control, and coordinated beamforming. As the names indicate, these techniques control the amount of interference generated in the time/frequency, power, and spatial domains.

Measurements and signalling to support ICIC between base stations and between base stations and terminals exist. Examples include the overload indicators for Wideband Code Division Multiple Access (WCDMA) and Long Term Evolution (LTE), and the High Interference Indicator for LTE.

FIG. 1A illustrates a user equipment in a first cell, receiving downlink data from a first base station and also interference from a downlink data transmission from a second base station to a second user equipment.

The expression "downlink" is in the present context used to specify the transmission from the base station to the user equipment, while the expression "uplink" is used to denote the transmission from the user equipment to the base station.

A problem with many ICIC mechanisms is that they are not able to follow rapid variations in traffic. Even though the existence of sensitive terminals, to which interference should be limited, can be dynamically detected, with rapidly varying and bursty traffic, it is not certain that these terminals will be receiving data at all times. As a consequence, limiting interference to these terminals is often done in vain, and the desired performance improvements are not obtained to the fullest extent.

Another problem with ICIC mechanism currently in LTE is that they require timely, and/or potentially substantial amount of, signalling over X2 between eNBs. X2 is the communication interface between the base stations, or eNBs, within a telecommunication network. Hence, network planning is needed in the sense that neighbour cell relations need to be established, as well as sufficient investments in X2 capacity.

Another problem with ICIC mechanisms currently comprised in LTE is that they do not include the spatial domain which is of interest in the context of multiple antennas at the transmit and/or receive side.

Yet another problem with current mechanisms is that it is not trivial for the base stations to obtain detailed knowledge, including the spatial domain, about the channels between the (sensitive) terminals and the other interfering base stations creating the interference. In the current specifications it is possible only to obtain (long term averaged) pathloss.

SUMMARY

It is therefore an object of the present invention to obviate at least some of the previously described disadvantages and to provide a mechanism for improving the performance in a telecommunication network.

According to a first aspect of the present invention, the object is achieved by a method in a first base station. The method aims at achieving intercell interference coordination in a telecommunication network. The telecommunication network comprises the first base station, acting as serving base station for a mobile station, and a second base station. The method comprises determining that transmission interference on the mobile station, is to be limited. Also, the method comprises triggering the mobile station to send a signal on a radio resource. The signal is to be received by the second base station, enabling the second base station to select transmission parameters that limits interference for the mobile station.

According to a second aspect of the present invention, the object is achieved by an arrangement in a first base station. The first base station is configured for intercell interference coordination in a telecommunication network. The telecommunication network comprises the first base station, acting as serving base station for a mobile station. Also, the telecommunication network comprises a second base station. The arrangement comprises a determining unit. The determining unit is configured to determine that transmission interference to the mobile station is to be limited. Further, the arrangement comprises a triggering unit. The triggering unit is configured to trigger the mobile station to send a signal on a radio resource. The signal is to be received by the second base station, enabling the second base station to select a transmission parameter that limits interference for the mobile station.

According to a third aspect of the present invention, the object is achieved by a method in a second base station. The method aims at intercell interference coordination in a telecommunication network. The telecommunication network comprises the second base station and a first base station, acting as serving base station for a mobile station. The method comprises receiving a signal on a radio resource from the mobile station. Also, the method comprises detecting a characteristic of the received signal. In addition, the method also comprises selecting a transmission parameter that limits interference for the mobile station, from which the signal was received, based on the detected characteristic of the received signal.

According to a fourth aspect of the present invention, the object is achieved by an arrangement in a second base station. The second base station is configured for intercell interference coordination in a telecommunication network. The telecommunication network comprises the second base station and a first base station, acting as serving base station for a mobile station. The second base station arrangement comprises a receiver. The receiver is configured to receive a signal on a specific radio resource from the mobile station. Also, the arrangement comprises a detecting unit. The detecting unit is configured to detect characteristic of the received signal. In further addition, the arrangement also comprises a selecting unit. The selecting unit is configured to select a transmission parameter that limits interference for the mobile station, from which the signal was received, based on characteristic of the received signal.

According to a fifth aspect of the present invention, the object is achieved by a method in a mobile station. The method aims at assisting intercell interference coordination in a telecommunication network. The telecommunication network comprises a first base station, acting as serving base station for the mobile station. The telecommunication network also comprises a second base station. The method comprises receiving a trigger from the first base station to send a signal on a radio resource. Also, the method comprises sending the signal to be received by the second base station, enabling the second base station to select a transmission parameter that limits interference for the mobile station, based on detected characteristic of the signal.

According to a sixth aspect of the present invention, the object is achieved by an arrangement in a mobile station. The mobile station arrangement is configured for assisting intercell interference coordination in a telecommunication network. The telecommunication network comprises a first base station, acting as serving base station for the mobile station. The telecommunication network also comprises a second base station. The mobile station arrangement comprises a receiver. The receiver is configured to receive a trigger from the first base station to send a signal on a radio resource. The arrangement also comprises a transmitter. The transmitter is configured to send the signal to be received by the second base station, enabling the second base station to select a transmission parameter that limits interference for the mobile station, based on detected characteristic of the signal.

Embodiments of the present methods provide reduced interference with a minimum of reduced resource utilization. Thereby is improved user quality achieved, such as e.g. increased data rates and system performance, such as e.g. capacity or spectral efficiency.

Additionally, by providing reduced interference, less retransmission has to be performed, which leads to saving of energy resources. Less retransmission also leads to an improved general system usage and performance improvement.

Further, embodiments of the present methods and arrangements provide Intercell Interference Coordination with reduced X2 signalling between base stations within the network, which saves resources.

In addition, embodiments of the present methods and arrangements provide an improved mechanism for performing an Intercell Interference Coordination, able to adapt and follow rapid variations in traffic. Thus the performance of the wireless network is improved.

Other objects, advantages and novel features of the invention will become apparent from the following detailed description of the invention.

BRIEF DESCRIPTION OF THE DRAWINGS

The invention is described in more detail with reference to attached drawings illustrating exemplary embodiments of the invention and in which.

DETAILED DESCRIPTION

The invention is defined as a method and arrangement in a first base station, a method and arrangement in a second base station and to a method and arrangement in a user equipment, which may be put into practice in the embodiments described below. This invention may, however, be embodied in many different forms and is not to be considered as limited to the embodiments set forth herein; rather, these embodiments are provided so that this disclosure will be thorough and complete, and convey the scope of the invention to those skilled in the art.

Still other objects and features of the present invention may become apparent from the following detailed description considered in conjunction with the accompanying drawings. It is to be understood, however, that the drawings are designed solely for purposes of illustration and not as a definition of the limits of the invention, for which reference is to be made to the appended claims. It is further to be understood that the drawings are not necessarily drawn to scale and that, unless otherwise indicated, they are merely intended to conceptually illustrate the structures and procedures described herein.

Figure 1A:
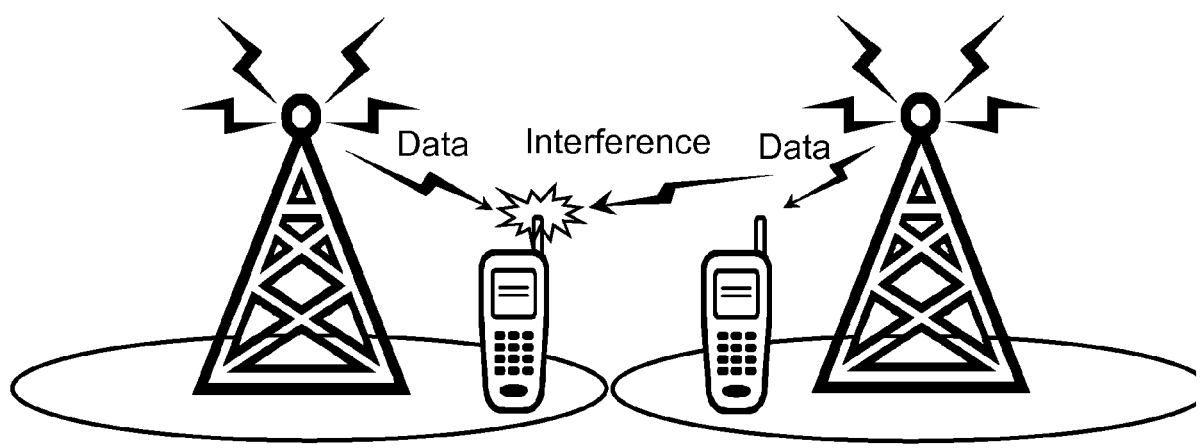
FIG. 1A is a schematic block diagram illustrating a telecommunication network according to prior art.
Figure 1B:
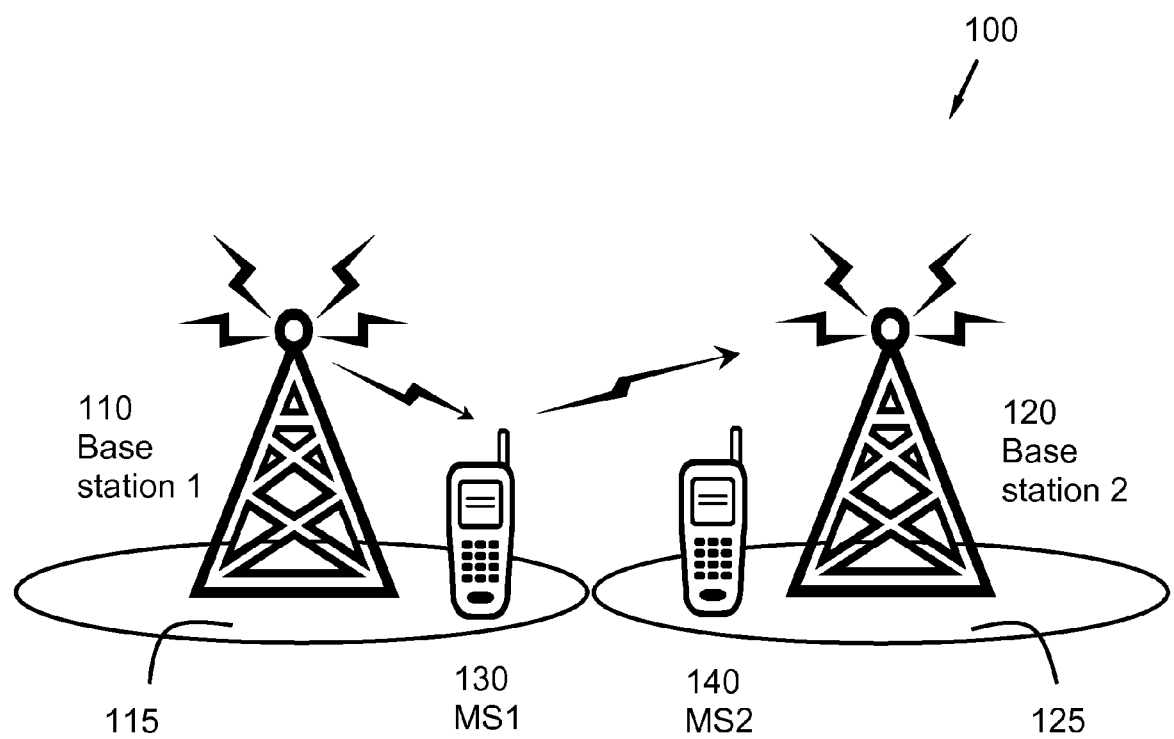
FIG. 1B is a schematic block diagram illustrating a telecommunication network according to some embodiments of the present invention.

FIG. 1B depicts a telecommunication network 100, based on technologies such as e.g. 3rd Generation Partnership Project (3GPP) Long Term Evolution (LTE), such as e.g. LTE Rel-8, LTE Rel-9, LTE Rel-10, Evolved Universal Terrestrial Radio Access Network (E-UTRAN), Universal Mobile Telecommunications System (UMTS), Global System for Mobile communications/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), or according to any other wireless communication technology etc, just to mention some few arbitrary and none limiting examples.

The telecommunication network 100 may be configured to operate according to the Time Division Duplex (TDD) and/or the Frequency Division Duplex (FDD) principle, according to different embodiments.

The telecommunication network 100 comprises a first base station 110 in a first cell 115 and a second base station 120 in a second cell 125. The second base station 120 is a neighbour base station to the first base station 110.

The term "neighbour base station" is in the present context to be interpreted in a radio sense, and not in a geographical sense. The telecommunication network 100 may further comprise a plurality of base stations 110, 120, such that the first base station 110 has a plurality of neighbour base stations 120.

The first base station 110 is serving base station for a first mobile station (MS) 130 in the first cell 115. A second mobile station 140 may be situated in the second cell 125. Further, the first base station 110 may serve a plurality of mobile stations 130 in the first cell 115 and the second base station 120 may correspondingly be serving base station for a plurality of mobile stations 140 in the second cell 125, even if, for enhanced visibility, only one mobile station 130, 140 is illustrated in each cell 115, 125.

In the following, the present methods and arrangements are further elaborated with specific reference to LTE networks. Thus the telecommunication network 100 is described as an LTE system throughout the rest of the description, for enhanced comprehension and readability. However, the corresponding concepts may also be applied in other wireless networks 100, based on other radio access technology.

The purpose of the illustration in FIG. 1B is to provide a general overview of the present methods and the functionalities involved.

The first base station 110 and the second base station 120 may communicate with each other over an interface, which may be a backhaul network interface or an intra base station communication link interface such as e.g. an X2 interface.

The first and second base stations 110, 120 may be referred to as e.g. base stations, Radio Base Stations (RBSs), macro base stations, NodeBs, evolved Node Bs (eNBs, or eNode Bs), base transceiver stations, Access Point Base Stations, base station routers, micro base stations, pico base stations, femto base stations, Home eNodeBs, relays and/or repeaters, or any other network node configured for communication with the user equipment 130, 140 over a wireless interface, depending e.g. of the radio access technology and terminology used. In the rest of the description, the term "first base station" and "second base station" will be used for the first and second base stations 110, 120, in order to facilitate the comprehension of the present methods and arrangements.

The mobile stations 130, 140 may be represented by e.g. a wireless communication terminal, a user equipment (UE), a mobile cellular phone, a Personal Digital Assistant (PDA), a wireless platform, a laptop, a computer or any other kind of device configured to communicate wirelessly with the first base station 110 and/or the second base station 120.

The first base station 110 is transmitting a trigger to the mobile station 130. The mobile station 130, as a response to the received trigger, transmits a sounding signal. The sounding signal is received by neighbouring base stations such as e.g. the second base station 120, which in turn may use the sounding signal received from the mobile station 130 for selecting a transmission parameter that limits interference for the mobile station 130, based on detected characteristic of the received sounding signal.

It should be noted that the base stations 110, 120 may have the functionalities for both triggering the mobile station 130 to transmit the signal, and for receiving said signal and using it as basis for selecting transmission resources. Such base station 110, 120 is capable of acting both as serving base station and neighbour base station.

It should be noted that the mobile station 130 is not targeting a specific base station 110, 120, but rather any base station 110, 120 that hears the signal is considered to be a neighbour base station that may interfere with the mobile station 130.

It is further to be noted that according to some embodiments may the first base station 110 transmit a trigger to a plurality of the mobile stations 130. The mobile stations 130, as a response to the received trigger, may then transmit a sounding signal each. The plurality of sounding signals may be received by neighbouring base stations such as e.g. the second base station 120, which in turn may use the sounding signals received from the mobile stations 130 for selecting at least one transmission parameter that limits interference for the mobile stations 130, based on detected characteristic of the received sounding signals.

The transmission parameter to be selected by the second base station 120 may comprise any of: frequency, time, transmission power, beamforming technique and/or precoder, as will be further exemplified in conjunction with FIGS. 1C-1F.

Figure 1C:
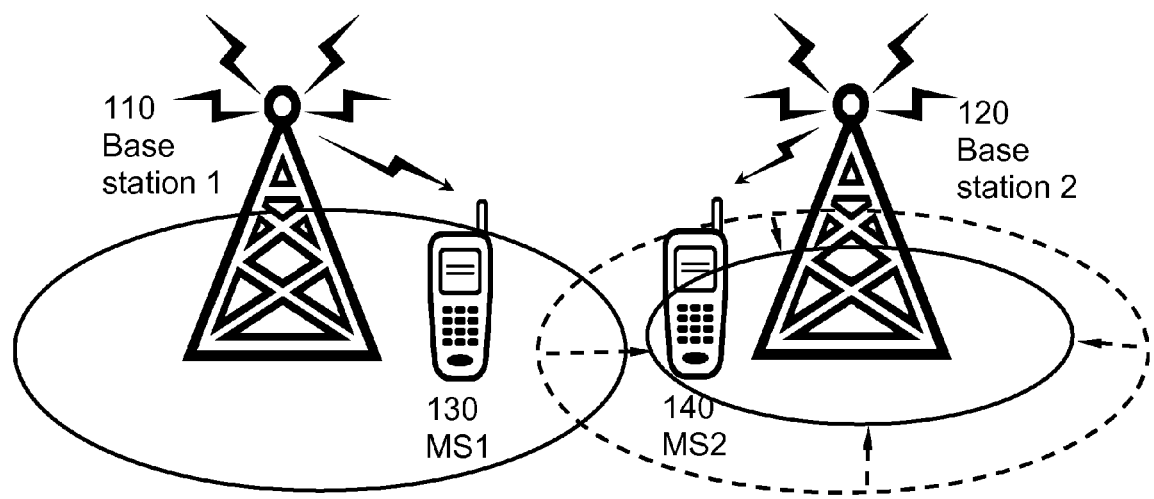
FIG. 1C is a schematic block diagram illustrating a telecommunication network according to some embodiments of the present invention.

FIG. 1C illustrates an embodiment of the present solution, wherein the second base station 120, when receiving the signal from the first mobile station 130, may decrease the transmission power. Thereby may the interference on the first mobile station 130 be decreased, while still being able to transmit signals to the second mobile station 140.

Figure 1D:
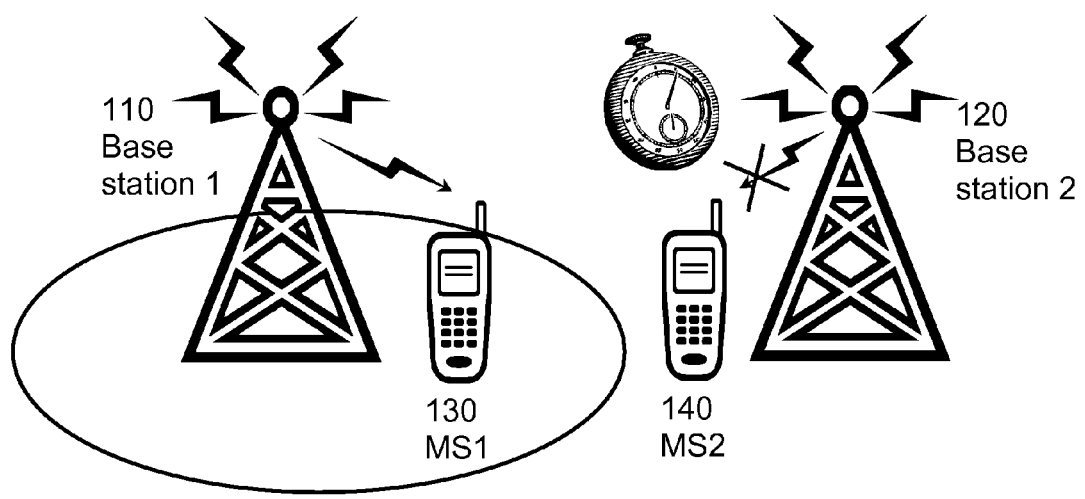
FIG. 1D is a schematic block diagram illustrating a telecommunication network according to some embodiments of the present invention.

FIG. 1D illustrates an embodiment of the present solution, wherein the second base station 120, when receiving the signal from the first mobile station 130, may avoid transmission to the second mobile station 140. Thus according to some embodiments may the second base station 120 suspend any transmissions to the second mobile station 140 for a time period.

Figure 1E:
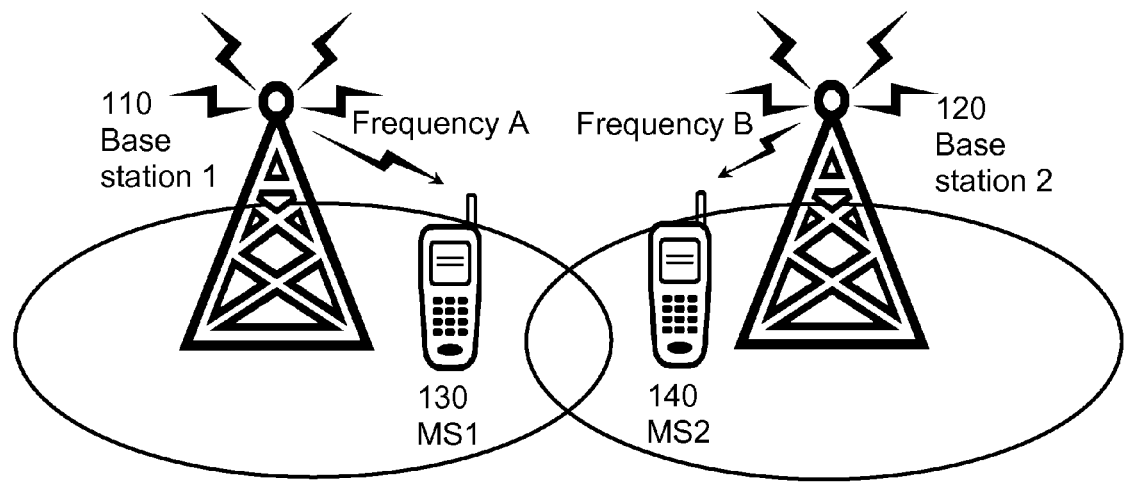
FIG. 1E is a schematic block diagram illustrating a telecommunication network according to some embodiments of the present invention.

FIG. 1E illustrates an embodiment of the present solution, wherein the second base station 120, when receiving the signal from the first mobile station 130, the second base station 120 may schedule any downlink transmissions to the second mobile station 140 on a frequency B, different from the frequency A used by the first mobile station 130.

Figure 1F:
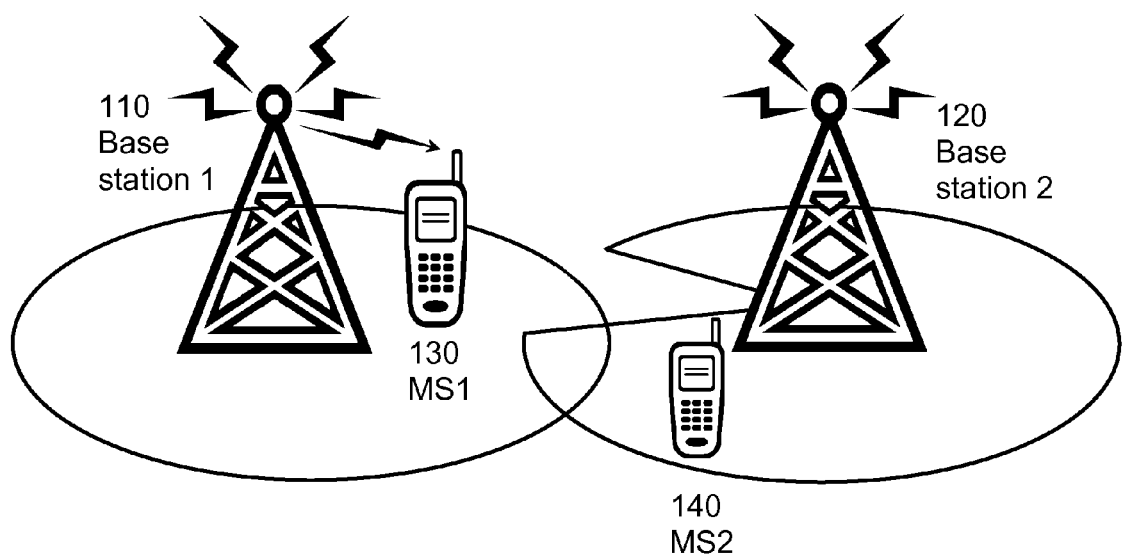
FIG. 1F is a schematic block diagram illustrating a telecommunication network according to some embodiments of the present invention.

FIG. 1F illustrates an embodiment of the present solution, wherein the second base station 120, when receiving the signal from the first mobile station 130, may determine the direction of the mobile station 130. Based on beamforming may the second base station 120 avoid transmission in the direction of the first mobile station 130, according to some embodiments.

It is to be noted however, that the selection of transmission parameter that limits interference for the mobile station 130, performed by the second base station 120 may comprise a plurality of transmission parameters, and may thus comprise a plurality of the enumerated interference limiting measures, illustrated in FIGS. 1C-1F.

Figure 2:
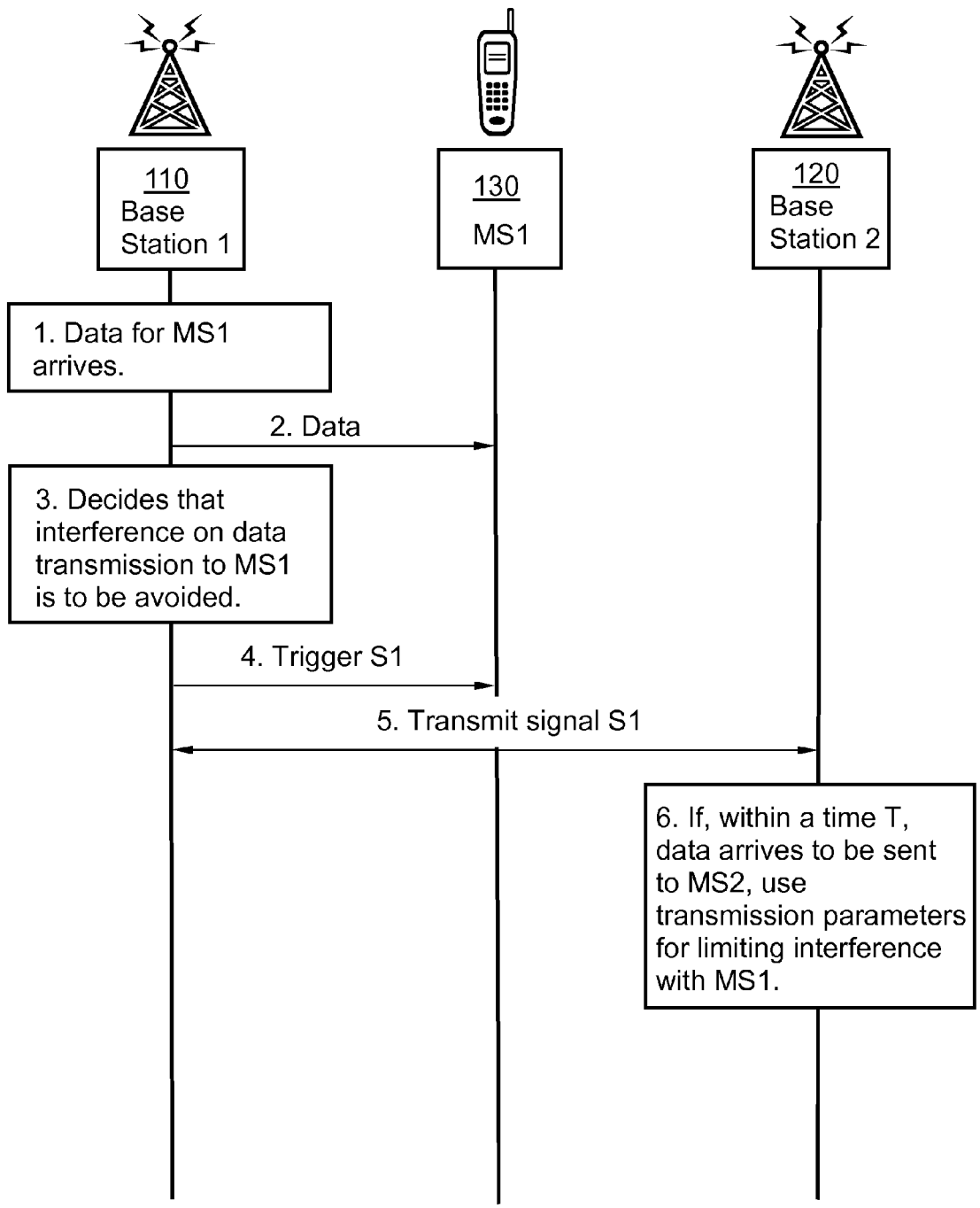
FIG. 2 is a combined flow chart and block diagram illustrating an embodiment of the present methods.

FIG. 2 is a combined flow chart and block diagram illustrating an embodiment of the present methods.

The present invention can be exemplified in the following non-limiting description of embodiments of the invention. In the following description, it is assumed that the signal to be triggered is a sounding signal, i.e. a reference signal without associated data. However, other uplink transmission could be used for this purpose, such as data transmission, uplink control signalling, e.g. hybrid-ARQ Acknowledgement/Non-acknowledgement (ACK/NACK) messages which is sent when the mobile station has received downlink data and can thereby be seen as an implicit triggering of a sounding signal. Another alternative may be to use random access signalling for this purpose.

In this particular context, the reciprocity may also be used to control transmission, e.g. scheduling from first base station 110 to first mobile station 130. By sounding in the frequency region that later will be used for downlink transmissions in the desired cell, first base station 110 could obtain information from the channel from the sounding transmitted by first mobile station 130.

An embodiment of the invention may comprise the following actions:

1. Data for the first mobile station 130 arrives to the first base station 110.

2. The first base station 110 sends data to the first mobile station 130.

3. The first base station 110 may decide that interference to its transmission to the first mobile station 130 should be avoided.

In a specific embodiment, this decision may apply to a subset of mobile stations 130, 140. The subset of mobile stations 130, 140 to send sounding signals could be selected based on for example interference situation, Quality-of-service parameters, traffic type, estimated transmission duration, and network load.

4. The first base station 110 triggers i.e. sends a signal to the first mobile station 130 to send a sounding signal S1 on a radio resource R, e.g. a certain time, frequency, and/or code. Steps 3 and 4 above could in an alternative embodiment be done before step 2, i.e. the first base station 110 may already before the transmission decide that interference should be avoided and wait with sending data to the first mobile station 130 until the sounding signal is sent.

According to some embodiments may a plurality of mobile stations 130, 140 share the same radio resource R, e.g. a certain time, frequency, and/or code.

The trigger to send the sounding signal could in a specific embodiment be comprised in a downlink scheduling assignment, for example as a bit in the downlink assignment explicitly used to trigger the mobile station 130 to transmit a sounding signal.

An alternative embodiment may be that a downlink assignment, if the mobile station 130 is configured so, triggers a transmission of a sounding signal, where the mobile station 130 for example may be configured by semi-static Radio Resource Control (RRC) signalling to transmit a sounding signal whenever it is scheduled in uplink or downlink.

Another possibility may be to have an implicit inclusion of a command to transmit sounding signal in for example Cyclic Redundancy Check (CRC).

Yet another alternative, or complement, to monitoring for sounding signals in the neighbouring second base station 140 may be to monitor the hybrid-ARQ acknowledgement/non-acknowledgement the mobile station 130 is transmitting in response to downlink transmissions.

To utilize frequency selective channel reciprocity, e.g. for TDD systems, the frequency of resource R may in a specific embodiment, be selected to be the same as, or overlapping with, the frequency resource later used for data transmission from the first base station 110 to the first mobile station 130. In this particular context, the reciprocity is used to control transmission, e.g. scheduling from the first base station 110 to the first mobile station 130. By sounding in the frequency region that later may be used for downlink transmissions in the specific cell 115, the first base station 110 could obtain information for the channel from the sounding transmitted by the first mobile station 130.

Also in FDD systems it may be useful to select the frequency of R so that it indicates what frequency may be used for data transmission. The second base station 120 then may be made aware of what frequency resources it may limit interference on.

In a specific embodiment, the resource assignment for the sounding signal could be coupled to the resource assignment for the data transmission from the first base station 110 to the first mobile station 130.

5. The second base station 120 may listen to signals received on resource R. It may estimate e.g. received power and spatial characteristics such as angle-of-arrival and/or covariance between it's receive antennas, according to some embodiments.

The second base station 120 may avoid and/or reduce interference to the first mobile station 130 by selecting the appropriate transmission parameters comprising e.g. (a) using different frequency or time resources for the second mobile station 140 used by the first mobile station 130, (b) using power control, and/or (c) using beamforming techniques to reduce interference e.g. by nulling transmissions in the direction of the first mobile station 130, or selecting a 'precoder' for the second mobile station 140, that results in reduced interference towards the first mobile station 130.

6. If, within a certain time T after having detected the sounding signal S1, covering the transmission of data from first base station 110 to the first mobile station 130, data to second mobile station 140 arrives to the second base station 120, the second base station 120 may send this data using transmission parameters limiting interference with the first mobile station 130. These transmission parameters are estimated based on the characteristics of step 5. The time T can be either preconfigured or signalled between base stations 110, 120.

It should be noted that the inventive concept may work for arbitrary reuse patterns. This may be accomplished by triggering mobile stations 130, 140 to send sounding signals only on the frequency bands they receive data on, and base stations 110, 120 listening to such signals only on bands where they send data, according to some embodiments.

As a complement to triggering transmission of a sounding signal in a single uplink symbol, a series with multiple sounding signals can be triggered according to some embodiments. A base station e.g. an eNodeB, such as the second base station 120 can employ time domain averaging to determine whether a sensitive mobile station 130, 140 is present or not.

In a specific embodiment, the same sounding signal resource in terms of bandwidth, frequency domain position and cyclic shifts may be shared by all mobile stations 130, 140 in a cell 115, 125 so that the neighbour base stations 110, 120 can detect and perform (time domain) averaging by listening only to a single sounding signal resource. In a system, the sequence used in different cells 115, 125 may stem from the same root sequence but different cells 115, 125 may use different cyclic shifts.

It should be noted that different time scales could be used dependent on what characteristics one want to achieve, e.g. use a "single shot" sounding signal to get the momentary situation in the cell 115, 125 or: time average over a longer period of time to obtain less noisy estimate of the interference situation and the "average" load in the cell 115, 125.

The latter case could be useful in order to avoid transmitting in a certain direction from neighbouring cells 115, 125.

Thus, the transmission of sounding signals and associated processing can be done on a longer time scale with time domain averaging in order to adapt the transmission in the neighbour cells 115, 125 to the actual mobile stations 130, 140 in the cell 115, 125. In an embodiment of the invention, neighbour base stations 120 may listen to special resources for sounding transmissions and there could be an exchange of information between base stations 110, 120 on resources used.

Figure 3:
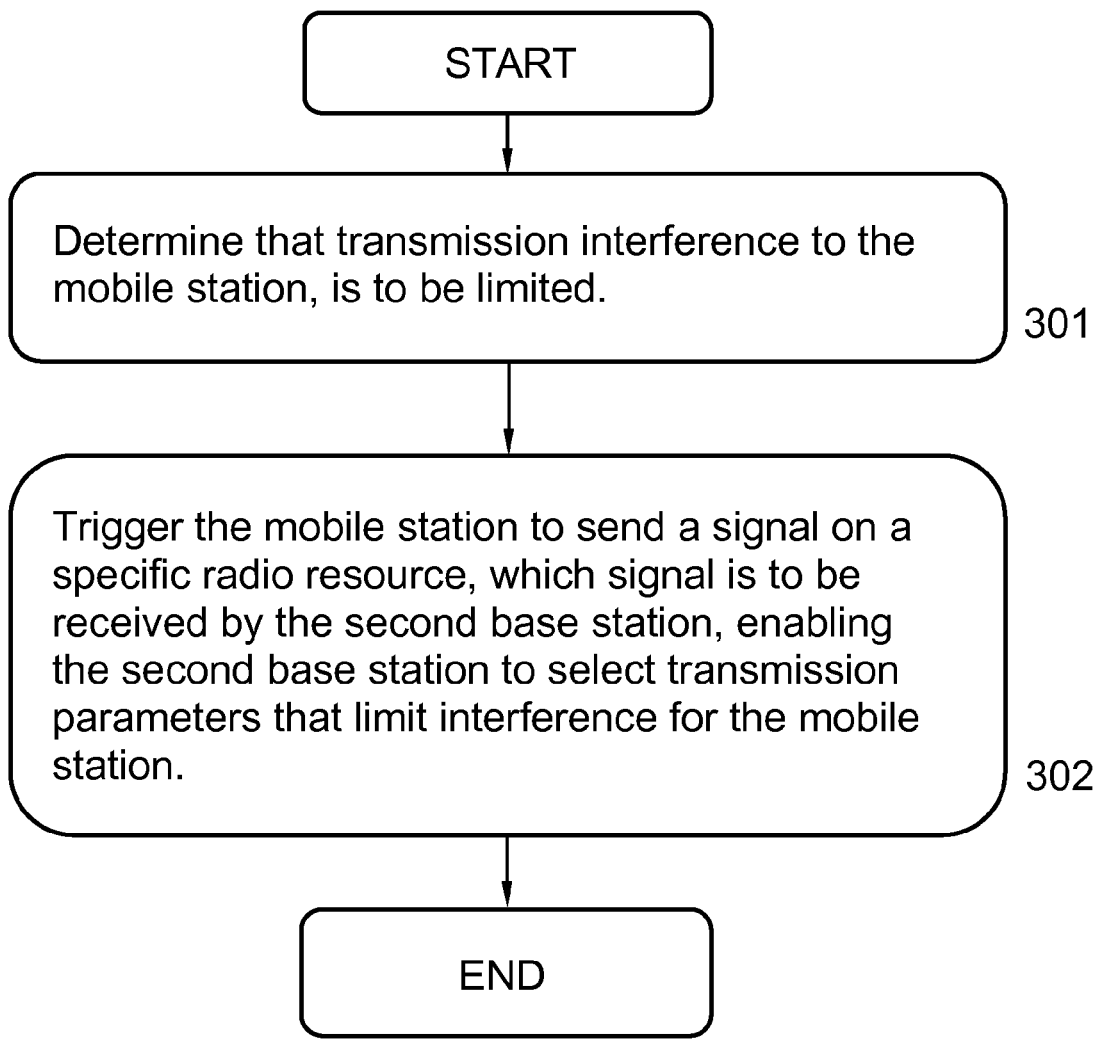
FIG. 3 is a flow chart illustrating an embodiment of the present method in a first base station.

FIG. 3 is a flow chart illustrating embodiments of method actions 301-302 for intercell interference coordination performed in a telecommunication network 100. The telecommunication network 100 comprises the first base station 110, acting as serving base station for a mobile station 130, and a second base station 120. The telecommunication network 100 may be e.g. a LTE radio network. The mobile station 130 may be e.g. a mobile telephone.

To appropriately perform intercell interference coordination, the method may comprise a number of method actions 301-302.

It is however to be noted that some of the described method actions, e.g. action 301-302 may be performed in a somewhat different chronological order and that some of them, e.g. action 301 and 302, may be performed simultaneously or in a rearranged chronological order. The method may comprise the following actions:

Action 301

Determining that interference on the mobile station 130 should be limited.

The decision to limit the transmission interference on the mobile station 130 may be based on e.g. the interference situation, Quality-of-Service parameters, traffic type, estimated transmission duration, channel quality report and/or network load, according to some embodiments.

Thus according to some embodiments the trigger may only be sent to mobile stations 130 which have reported strong interference e.g. in a signal strength measurement report, or which are considered to be at the cell edge. According to some embodiments the trigger may be sent to mobile stations 130 being considered to be in particular sensitive to interference, such as e.g. mobile stations 130 belonging to emergency personnel, ambulance staff, firemen, police etc, or customers having a premium subscription. However, the decision may further be based on the traffic load, such that if it is known e.g. from statistics or previously made estimations of the traffic load that the network load, and thus the potential risk of interference, is increased during certain times of the day, the mobile station 130 may be triggered to signal only between those hours. Thus interference may be limited at the times of the day when it may be a problem for the communication while at the same time the trigger may be inhibited when the traffic load, and thereby also the risk of interference is low, which save overhead traffic and may lead to somewhat reduced use of transmission power. However, the decision may be based on the fact that the first base station 110 has data to transmit to the mobile station 130. According to some embodiments, the decision may be based on the content of the data, such that if data which is in particular sensitive for retransmission is scheduled for the mobile station 130, it may be determined to limit interference. According to some embodiments may the trigger thus be sent to a plurality of mobile stations 130 within the cell 115.

Action 302

The mobile station 130 is triggered by the first base station 110 to send a signal on a radio resource. The signal may be received by the second base station 120, enabling the second base station 120 to select a transmission parameter that limits interference for the mobile station 130.

The trigger thus may comprise an instruction to send the signal on the radio resource. The radio resource may comprise any of: a certain time, frequency and/or code, according to some embodiments. Thus the mobile station 130 may transmit the triggered signal e.g. in a certain frequency, which may be predetermined. Optionally may the frequency used for transmitting the triggered signal be the same frequency that will be used by the first base station 110 to send data to the mobile station 130. Information concerning which radio resource to send the signal on may be comprised in the trigger according to some embodiments, or it may be predetermined, or signalled separately from the first base station 110 to the first mobile station 130.

The trigger sent to the mobile station 130 for triggering the mobile station 130 to send the signal may according to some embodiments be comprised in a downlink scheduling assignment, sent to the mobile station 130. Thereby may the mobile station 130 receive the trigger simultaneously with receiving the downlink scheduling assignment, which may be an advantage in terms of timing the emitted signal, to be received by the second base station 120, enabling the second base station 120 to select one or more transmission parameters that limit interference for the mobile station 130 with the assigned downlink data transmission from the first base station 110 to the mobile station 130.

The signal triggered to be sent by the mobile station 130 may be e.g. a sounding signal. However, it may further be a reference signal, a data transmission, uplink control signalling, e.g. hybrid-ARQ Acknowledgement/Non-acknowledgement (ACK/NACK) messages, random access signalling etc.

According to some embodiments may a plurality of mobile stations 130 be triggered by the first base station 110 to send a signal on the radio resource, which may be the same radio resource for all, or at least some of the mobile stations 130. The signals thus emitted from the plurality of mobile stations 130 may be received by the second base station 120, enabling the second base station 120 to select one or more transmission parameters that limit interference for the plurality of mobile stations 130.

Further, the mobile station 130 or plurality of mobile stations 130 may be triggered to transmit one signal, a burst of signals or a signal/signal burst which is repeatedly transmitted at a certain time interval such as e.g. every 10 ms, just to mention an arbitrary time interval. The certain time interval may be predetermined according to some embodiments, or, alternatively, dynamically configured. The certain time interval may be different for different mobile stations 130, it may be the same for all mobile stations 130 within the cell 115, or it may be the same for all mobile stations 130, 140 within the telecommunication network 100, according to some embodiments. The repeatedly transmitted signals or signal bursts may be transmitted a certain number of times, or for a certain time period. The signal or signal burst may optionally be triggered to be repeatedly transmitted for as long as the mobile station 130 is situated within the cell 115 served by the first base station 110. Further, according to some embodiments may the signal or signal burst be repeated at some interval while data transmission is still going on. Thus the second base station 140 knows that the data transmission has terminated, on that mobile station 130 at least, when the signalling stops.

An advantage may be that the certain time period may be used by the second base station 140 to either identify a particular mobile station 130 outside the own cell 125, or to identify the cell 115 in which the mobile station 130 is situated. An advantage with triggering a burst of signals, a repeated sequence of signals or even a repeated sequence of signals bursts is that the second base station 140 easier detect the signals and/or signal bursts. Also, according to some embodiments, the second base station 140 may be able to detect hotspots within the neighbour cell 115, with a particular high density of mobile stations 130, i.e. where a particular large number of mobile stations 130 are situated. The second base station 140 may use this detected information e.g. to prioritise beamforming within the cell 125, served by the second base station 140, such that radio transmissions directed against detected hotspots in the neighbour cell 115 are nulled out, based e.g. on the number of detected mobile stations 130 within the hotspots.

Figure 4:
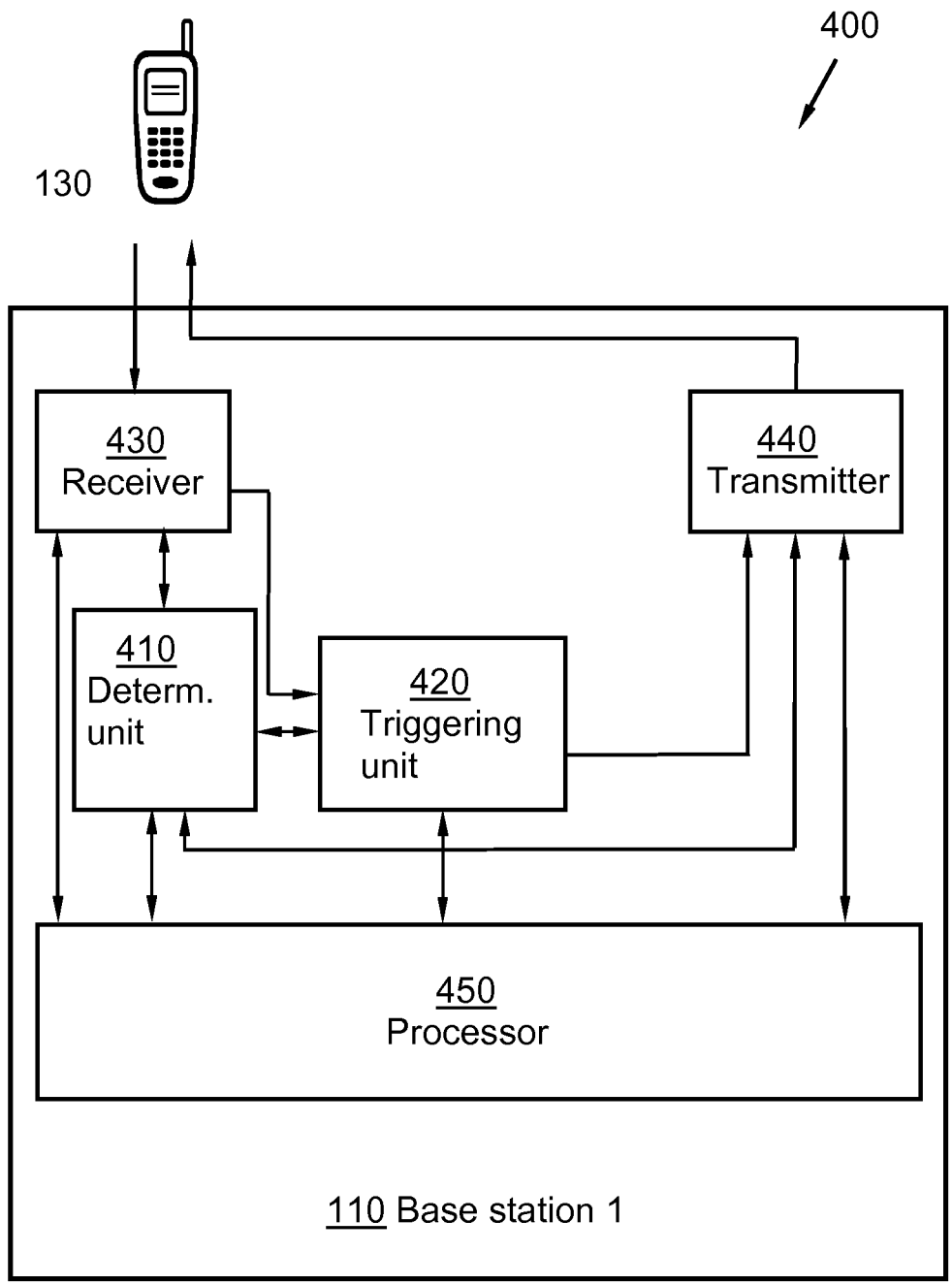
FIG. 4 is a schematic block diagram illustrating an arrangement in a first base station according to some embodiments.

FIG. 4 schematically illustrates an arrangement 400 in a first base station 110. The arrangement 400 is configured to perform any, some or all of the actions 301-302 in order to achieve intercell interference coordination in a telecommunication network 100. The telecommunication network 100 comprises the first base station 110, acting as serving base station for a mobile station 130, and a second base station 120.

In order to perform the actions 301-302 correctly, the arrangement 400 comprises e.g. a determining unit 410, configured to determine that transmission interference to the mobile station 130 is to be limited.

Also, the arrangement 400 further comprises, in addition, a triggering unit 420, configured to trigger the mobile station 130 to send a signal on a radio resource, which signal is to be received by the second base station 120, enabling the second base station 120 to select a transmission parameter that limits interference for the mobile station 130.

Also, the arrangement 400 further may comprise a receiver 430, that may be configured to receive signals over a radio interface from other nodes, e.g. from the mobile station 130, according to some embodiments.

Further, according to some embodiments, the arrangement 400 may comprise a transmitter 440, that may be configured to transmit the trigger to the mobile station 130 over a radio interface.

In addition, the arrangement 400 may comprise a processor 450, that may be configured to process the above described actions 301 and 302 in order to achieve intercell interference coordination in the telecommunication network 100.

The processor 450 may be represented by e.g. a Central Processing Unit (CPU), a microprocessor, or other processing logic that may interpret and execute instructions. The processor 450 may perform data processing functions for inputting, outputting, and processing of data including data buffering and device control functions, such as call processing control, user interface control, or the like.

It is to be noted that any internal electronics of the arrangement 400, not completely necessary for understanding the present method according to the actions 301-302 has been omitted from FIG. 4, for clarity reasons.

Further, it is to be noted that some of the described units 410-450 comprised within the arrangement 400 in the first base station 110 in the telecommunication network 100 are to be regarded as separate logical entities but not with necessity separate physical entities. To mention just one example, the receiving unit 430 and the transmitter 440 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the first base station 110, and/or the second base station 120 and the mobile station 130 may comprise both traffic and control signals e.g. paging signals/messages for incoming calls, which may be used to establish and maintain a voice call communication with another party or to transmit and/or receive data, such as SMS, e-mail or MMS messages, with a remote user equipment 140.

The actions 301-302 in the first base stations 110 may be implemented through one or more processors 450 in the arrangement 400, together with computer program code for performing the functions of the present actions 301-302. Thus a computer program product, comprising instructions for performing the actions 301-302 in the arrangement 400 may perform those actions in order to achieve intercell interference coordination in the telecommunication network 100, when the computer program product is loaded into the processor 450.

The computer program product mentioned above may be provided for instance in the form of a data carrier carrying computer program code for performing the method actions according to the present solution when being loaded into the processor unit 450. The data carrier may be e.g. computer readable storage medium such as a hard disk, a CD ROM disc, a memory stick, an optical storage device, a magnetic storage device or any other appropriate medium such as a disk or tape that can hold machine readable data. The computer program code can furthermore be provided as program code on a server and downloaded to the first base station 110 remotely, e.g. over an Internet or an intranet connection.

Figure 5:
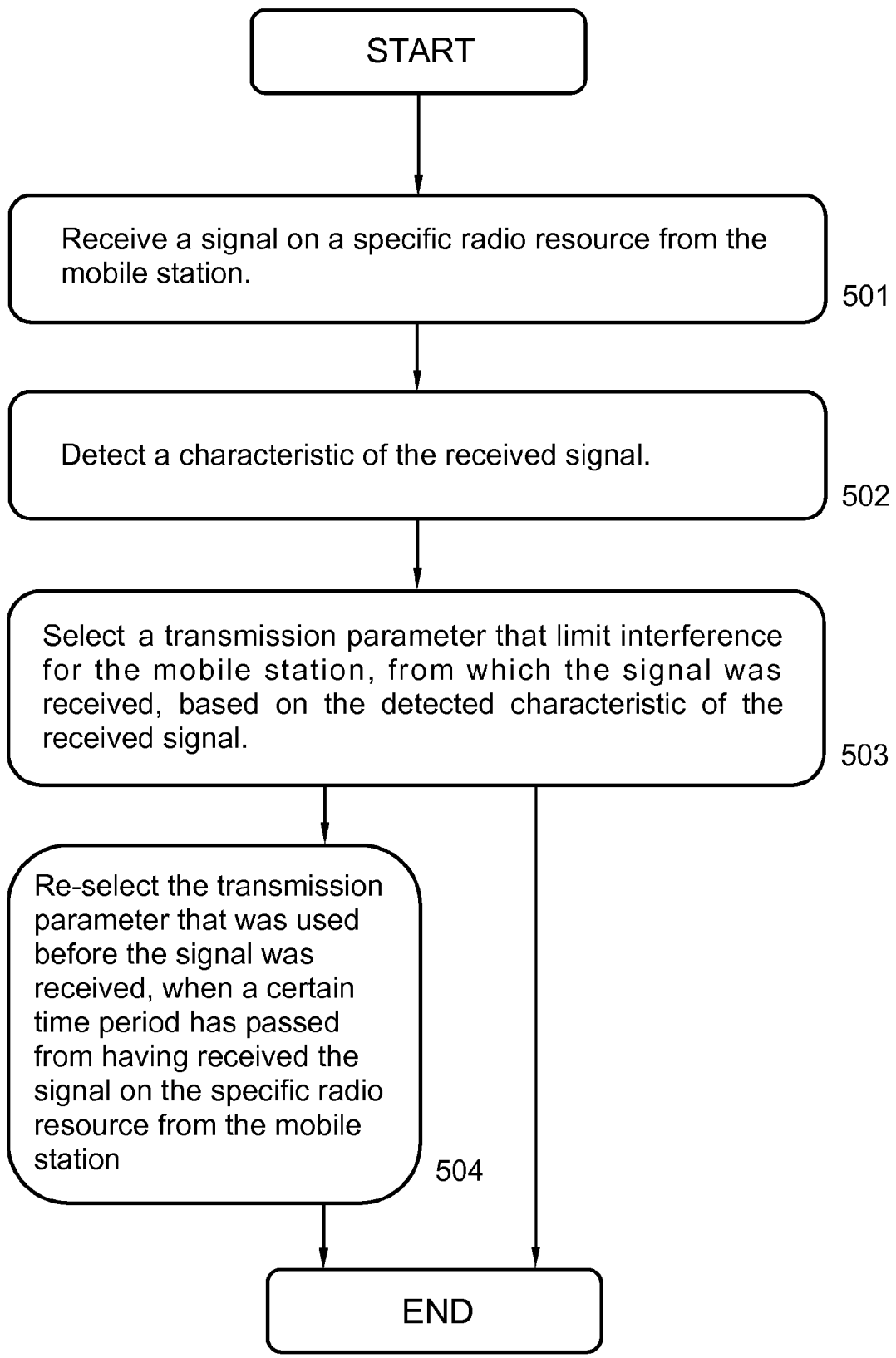
FIG. 5 is a flow chart illustrating an embodiment of the present method in a second base station.

FIG. 5 is a flow chart illustrating embodiments of method actions 501-504 in a second base station 120. The actions 501-504 aims at intercell interference coordination performed in a telecommunication network 100. The telecommunication network 100 comprises a first base station 110, acting as serving base station for a mobile station 130, and the second base station 120. The second base station 120 is neighbour base station in a radio sense, to the first base station 110. The telecommunication network 100 may be e.g. a LTE radio network. The mobile station 130 may be e.g. a mobile telephone.

To appropriately perform intercell interference coordination within the telecommunication network 100, the method may comprise a number of method actions 501-504.

It is however to be noted that some of the described method actions, e.g. action 501-504 may be performed in a somewhat different chronological order than the enumeration suggests and that some of them, e.g. action 501 and 502, may be performed simultaneously or in a rearranged chronological order. Further, some of the actions such as e.g. action 504 is optional and may only be performed within some embodiments. The method may comprise the following actions:

Action 501

A signal is received from the mobile station 130 on a radio resource.

The radio resource may comprise any of: a certain time, frequency and/or code.

The received signal may be comprised within a signal burst, according to some embodiments. According to some embodiments may signals be received from a plurality of mobile stations 130, i.e. a plurality of mobile stations 130 may have been triggered to emit sounding signals in parallel with each other.

Action 502

A characteristic of the received signal is detected. The detection may be made using reciprocity. By using reciprocity, the base station 110 may draw conclusions on the downlink situation by observing the received sounding in the uplink.

The characteristic may according to some embodiments be e.g. received transmission power, frequency, angle-of-arrival and/or covariance between receive antennas.

An advantage with detecting the characteristic of the received signal by detecting the received transmission power is that the approximate distance to the first mobile station 130, and thereby also the risk for interference on the first mobile station 130, due to reciprocity may be estimated. The received transmission power may e.g. be compared with a threshold value according to some embodiments. If the threshold value is exceeded, transmission parameters may be selected for limiting interference for the signal emitting first mobile station 130 according to some embodiments.

The angle-of-arrival may according to some embodiments be detected and used for determining the direction of the signal emitting first mobile station 130. The determined angle-of-arrival may be used as a basis for beamforming, and/or nulling out transmissions in the detected direction.

In case a plurality of signals has been received from a plurality of mobile stations 130, a characteristic of each of the received signals such as e.g. angle-of-arrival, may be detected.

Action 503

A transmission parameter that limits interference for the mobile station 130, from which the signal was received, is selected based on the detected characteristic of the received signal.

The transmission parameter to be selected may according to some embodiments comprise any of: frequency, time, transmission power, beamforming technique and/or precoder. Further, a plurality of such transmission parameters may be combined.

In further addition, in case a plurality of signals has been received from a plurality of mobile stations 130, a transmission parameter that limits interference for each of the mobile stations 130, from which the signals were received, may be selected based on the detected characteristic of the received signals. Thus, according to some embodiments, different transmission parameters may be selected for different mobile stations 130. However, according to some embodiments may the same transmission parameter such as e.g. beamforming be applied in order to avoid or at least reduce radio transmissions in directions of a plurality of mobile stations 130, i.e. a hotspot within the neighbour cell 115.

Action 504

This action is optional and may be performed only within some embodiments.

The transmission parameter that was used before the signal was received may be reselected, when a certain time period has passed from having received the signal on the specific radio resource from the mobile station 130.

The certain time period may be predetermined according to some embodiments, or signalled to the second base station 120, e.g. over an intra base station interface such as X2, from the first base station 110. According to some embodiments, the certain time period may be signalled from the mobile station 130. The certain time period may have the approximate duration of the scheduled downlink transmission from the first base station 110 to the first mobile station 130, according to some embodiments.

An advantage with returning back to the previously used transmission parameter after certain time period may be that the downlink capacity of the second base station 120 is limited for as short period as possible. Thus, when there is no longer any need or advantage to limit the interference on the first mobile station 130, e.g. due to that no more downlink transmission from the first base station 110 is scheduled for the first mobile station 130, the second base station 120 may revert to the previously used transmission parameter/s.

Figure 6:
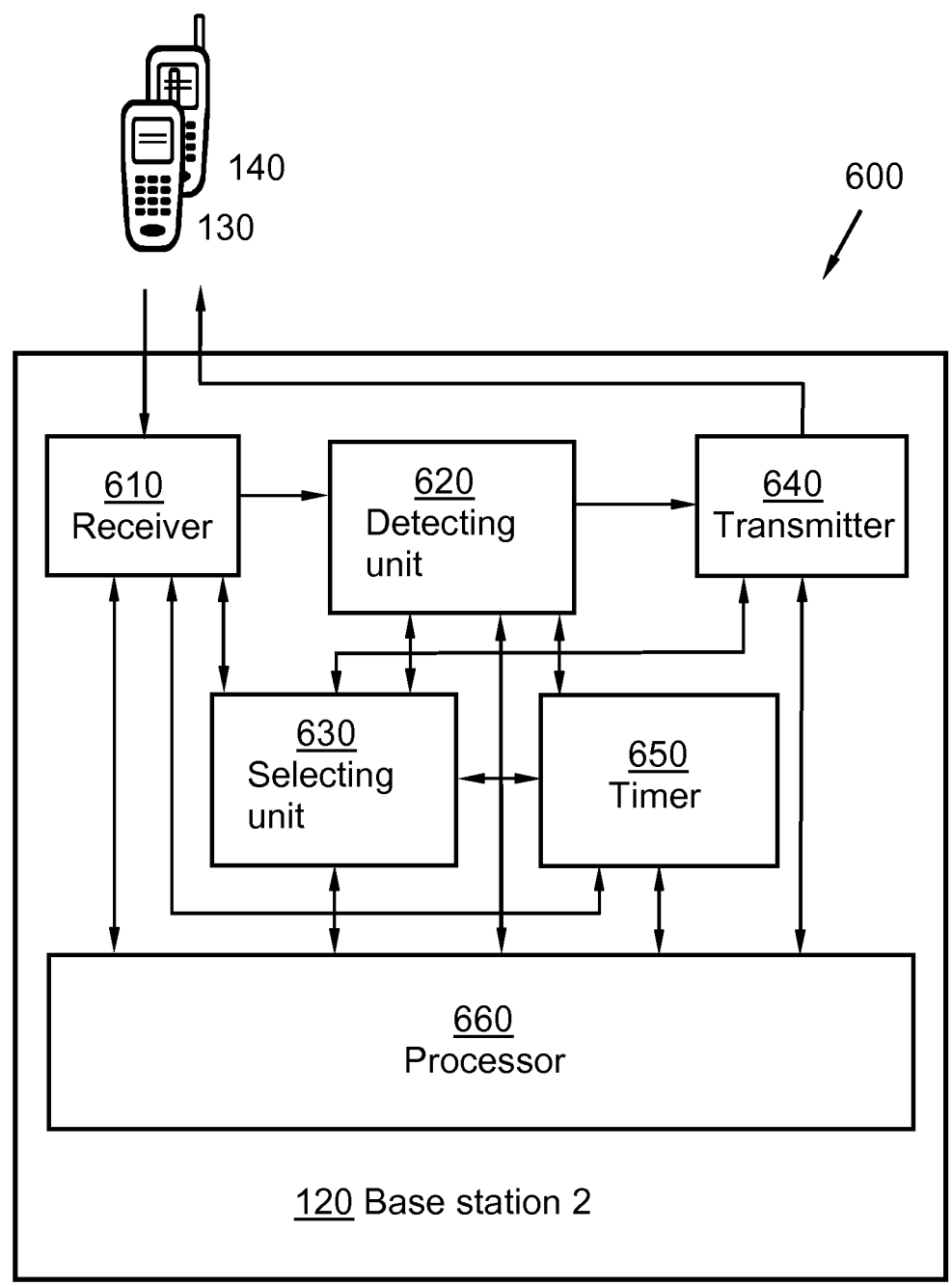
FIG. 6 is a schematic block diagram illustrating an arrangement in a second base station according to some embodiments.

FIG. 6 schematically illustrates an arrangement 600 in a second base station 110. The arrangement 600 is configured to perform any, some or all of the actions 501-504 in order to achieve intercell interference coordination in a telecommunication network 100. The telecommunication network 100 comprises a first base station 110, acting as serving base station for a mobile station 130, and the second base station 120. The second base station 120 is neighbour base station in a radio sense, to the first base station 110.

In order to perform the actions 501-504 correctly, the arrangement 600 comprises e.g. a receiver 610, configured to receive a signal on a specific radio resource from the mobile station 130. Also, the arrangement 600 comprises a detecting unit 620, configured to detect characteristic of the received signal. Further, the arrangement 600 comprises a selecting unit 630, configured to select one or more transmission parameters that limit interference for the mobile station 130, from which the signal was received, based on characteristic of the received signal.

Further, according to some embodiments, the second base station arrangement 600 may comprise a transmitter 640. The transmitter 640 may be configured to transmit radio signals to the mobile stations 130, 140 over a radio interface.

Additionally, according to some embodiments may the second base station arrangement 600 comprise a timer 650. The optional timer 650 is configured to measure time, such as measuring the certain time period that has passed from having received the signal on the specific radio resource from the mobile station 130.

In addition, the arrangement 600 may comprise a processor 660 that may be configured to process at least some of the above described actions 501-504 in order to achieve intercell interference coordination in the telecommunication network 100.

The processor 660 may be represented by e.g. a Central Processing Unit (CPU), a microprocessor, or other processing logic that may interpret and execute instructions. The processor 660 may perform data processing functions for inputting, outputting, and processing of data including data buffering and device control functions, such as call processing control, user interface control, or the like.

It is to be noted that any internal electronics of the arrangement 600, not completely necessary for understanding the present method according to the actions 501-504 has been omitted from FIG. 6, for clarity reasons.

Further, it is to be noted that some of the described units 610-660 comprised within the arrangement 600 in the second base station 120 in the telecommunication network 100 are to be regarded as separate logical entities but not with necessity separate physical entities. To mention just one example, the receiver 610 and the transmitter 640 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the first base station 110, and/or the second base station 120 and the mobile station 130 may comprise both traffic and control signals e.g. paging signals/messages for incoming calls, which may be used to establish and maintain a voice call communication with another party or to transmit and/or receive data, such as SMS, e-mail or MMS messages, with a remote user equipment 140.

The actions 501-504 in the second base stations 120 may be implemented through one or more processors 660 in the arrangement 600, together with computer program code for performing the functions of the present actions 501-504. Thus a computer program product, comprising instructions for performing the actions 501-504 in the arrangement 600 may perform those actions in order to achieve intercell interference coordination in the telecommunication network 100, when the computer program product is loaded into the processor 660.

The computer program product mentioned above may be provided for instance in the form of a data carrier carrying computer program code for performing the method actions according to the present solution when being loaded into the processor unit 660. The data carrier may be e.g. computer readable storage medium such as a hard disk, a CD ROM disc, a memory stick, an optical storage device, a magnetic storage device or any other appropriate medium such as a disk or tape that can hold machine readable data. The computer program code can furthermore be provided as program code on a server and downloaded to the second base station 120 remotely, e.g. over an Internet or an intranet connection.

Figure 7:
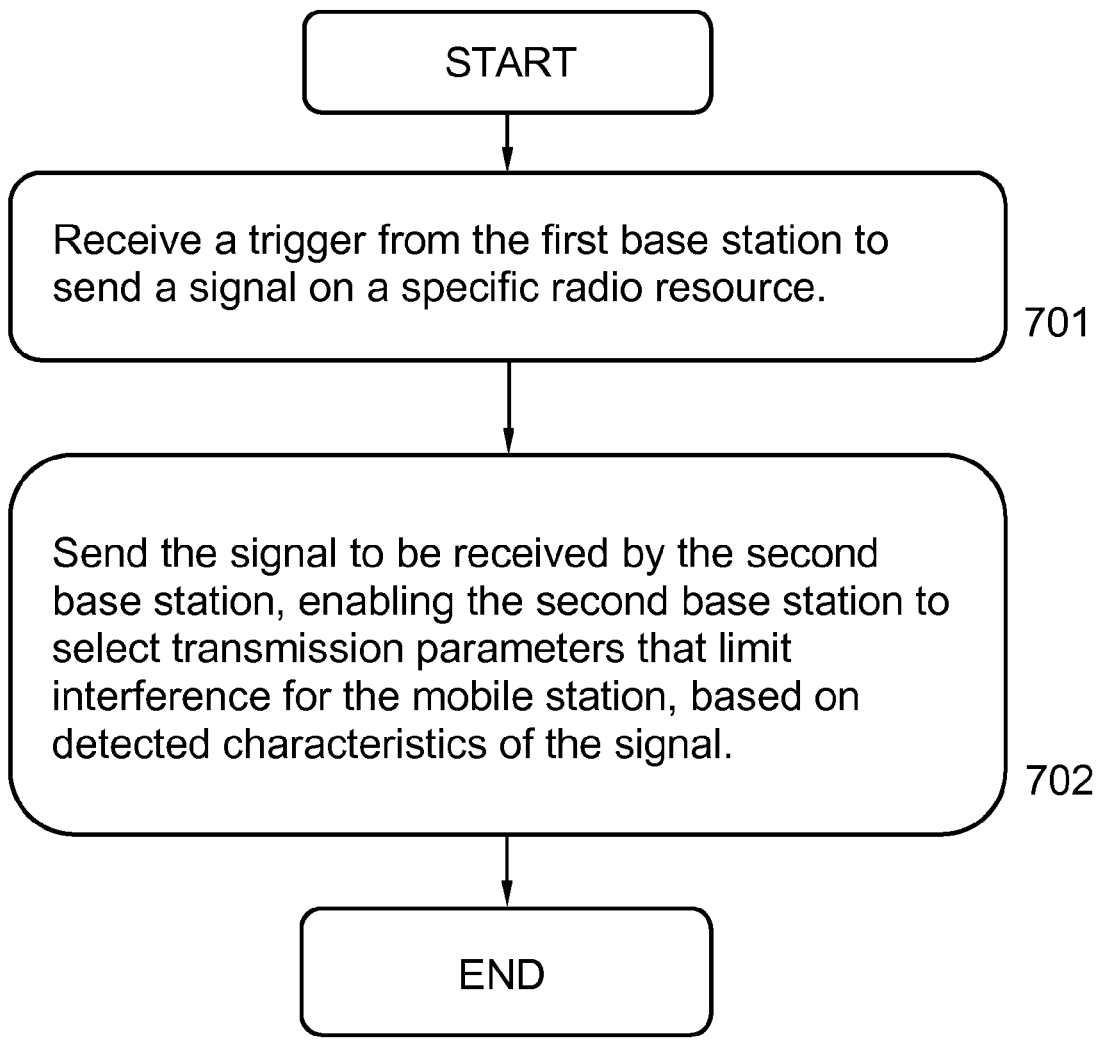
FIG. 7 is a flow chart illustrating an embodiment of the present method in a user equipment.

FIG. 7 is a flow chart illustrating embodiments of method actions 701-702 in a mobile station 130. The actions 701-702 aims at intercell interference coordination performed in a telecommunication network 100. The telecommunication network 100 comprises a first base station 110, acting as serving base station for the mobile station 130, and a second base station 120. The second base station 120 is neighbour base station in a radio sense, to the first base station 110. The telecommunication network 100 may be e.g. a LTE radio network. The mobile station 130 may be e.g. a mobile telephone.

To appropriately perform intercell interference coordination within the telecommunication network 100, the method may comprise a number of method actions 701-702.

It is however to be noted that some of the described method actions, e.g. action 701-702 may be performed in a somewhat different chronological order than the enumeration suggests and that some of them, e.g. action 701 and 702, may be performed simultaneously or in a rearranged chronological order. The method may comprise the following actions:

Action 701

A trigger to send a signal on a radio resource is received from the first base station 110.

The trigger may be received in a downlink assignment, according to some embodiments. The trigger may be seen as an instruction for the mobile station 130 to send the signal, to be received by the second base station 120, neighbour base station to the first base station 110, which is serving base station for the first mobile station 130.

Action 702

The signal to be received by the second base station 120 is sent. The signal enables the second base station 120 to select a transmission parameter that limits interference for the mobile station 130, based on detected characteristic of the signal.

According to some embodiments may the signal be e.g. a sounding signal, a reference signal, a data transmission, uplink control signalling, e.g. hybrid-ARQ Acknowledgement/Non-acknowledgement (ACK/NACK) messages, random access signalling etc.

Further, the triggered signal may be one signal, a burst of signals or a signal/signal burst which is repeatedly transmitted at a certain time interval such as e.g. every 10 ms, just to mention an arbitrary time interval.

Figure 8:
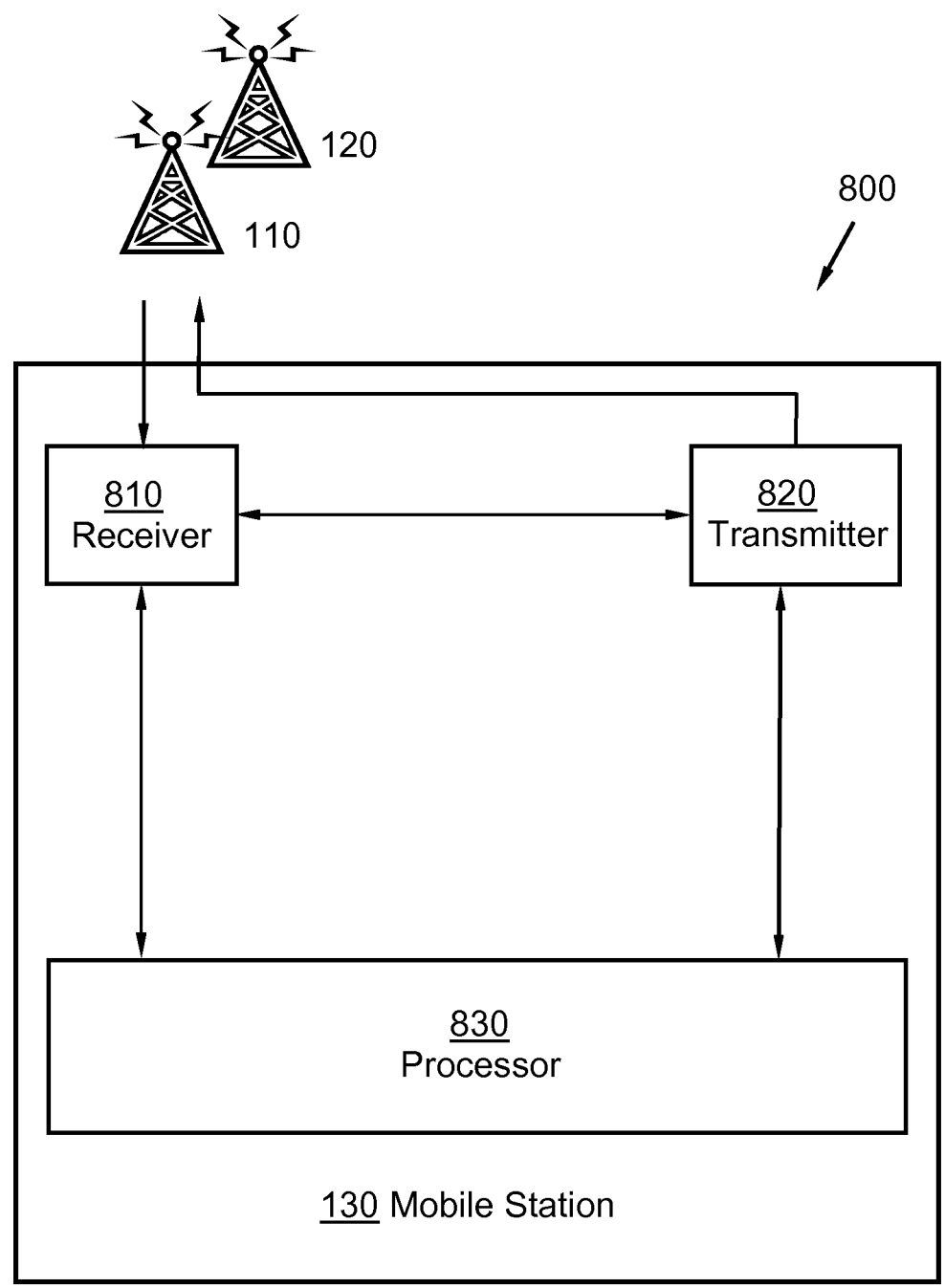
FIG. 8 is a schematic block diagram illustrating an arrangement in a user equipment according to some embodiments.

FIG. 8 schematically illustrates an arrangement 800 in a first mobile station 130. The arrangement 800 is configured to perform any, some or all of the actions 701-702 in order to assist in achieving intercell interference coordination in a telecommunication network 100. The telecommunication network 100 comprises a first base station 110, acting as serving base station for the mobile station 130, and a second base station 120. The second base station 120 is neighbour base station, in a radio sense, to the first base station 110.

In order to perform the actions 701-702 correctly, the arrangement 800 comprises e.g. a receiver 810, configured to receive a trigger from the first base station 110 to send a signal on a radio resource. Also, the arrangement 800 comprises a transmitter 820, configured to send the signal to be received by the second base station 120, enabling the second base station 120 to select a transmission parameter that limits interference for the mobile station 130, based on detected characteristic of the signal.

In addition, the arrangement 800 may comprise a processor 830 that may be configured to process at least some of the above described actions 701-702 in order to achieve intercell interference coordination in the telecommunication network 100.

The processor 830 may be represented by e.g. a Central Processing Unit (CPU), a microprocessor, or other processing logic that may interpret and execute instructions. The processor 830 may perform data processing functions for inputting, outputting, and processing of data including data buffering and device control functions, such as call processing control, user interface control, or the like.

It is to be noted that any internal electronics of the arrangement 800, not completely necessary for understanding the present method according to the actions 701-702 has been omitted from FIG. 8, for clarity reasons.

Further, it is to be noted that some of the described units 810-830 comprised within the arrangement 800 in the mobile station 130 in the telecommunication network 100 are to be regarded as separate logical entities but not with necessity separate physical entities. To mention just one example, the receiver 810 and the transmitter 820 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the first base station 110, and/or the second base station 120 and the mobile station 130 may comprise both traffic and control signals e.g. paging signals/messages for incoming calls, which may be used to establish and maintain a voice call communication with another party or to transmit and/or receive data, such as SMS, e-mail or MMS messages, with a remote user equipment 140.

The actions 701-702 in the mobile station 130 may be implemented through one or more processors 830 in the arrangement 800, together with computer program code for performing the functions of the present actions 701-702. Thus a computer program product, comprising instructions for performing the actions 701-702 in the arrangement 800 may perform those actions in order to achieve intercell interference coordination in the telecommunication network 100, when the computer program product is loaded into the processor 830.

The computer program product mentioned above may be provided for instance in the form of a data carrier carrying computer program code for performing the method actions according to the present solution when being loaded into the processor unit 830. The data carrier may be e.g. computer readable storage medium such as a hard disk, a CD ROM disc, a memory stick, an optical storage device, a magnetic storage device or any other appropriate medium such as a disk or tape that can hold machine readable data. The computer program code can furthermore be provided as program code on a server and downloaded to the first mobile station 130 remotely, e.g. over an Internet or an intranet connection.

Some Particular Embodiments

The present invention thus aims to provide an improved ICIC mechanism that solves at least some of the above mentioned problems.

A first embodiment of the invention relates to a method in a base station 110, acting as serving base station, for intercell interference coordination in a telecommunication network 100, comprising the steps of determining that interference to transmission to at least one mobile station 130, MS, served by said base station 110, should be avoided; and triggering said at least one mobile station 130 to send a signal on a specific uplink radio resource, said signal is to be monitored by at least one neighbour base station 120, such that said neighbour base station 120, based on detected characteristics of said signal, may select transmission parameters for its downlink transmission that limit interference for said at least one mobile station 130.

A second embodiment of the invention relates to a base station 110 capable of acting as a serving base station in a telecommunication network 100, said base station 110 comprising a mechanism for intercell interference coordination, said mechanism comprising a determining unit configured to determine that interference to transmission to at least one mobile station 130, MS, served by said base station 110, should be avoided; and a triggering unit configured to trigger said at least one mobile station 130 to send a signal on a specific uplink radio resource, said signal is to be monitored by at least one neighbour base station 120, such that said neighbour base station 120, based on detected characteristics of said signal, may select transmission parameters for its downlink transmission that limit interference for said at least one mobile station 130.

A third embodiment of the invention relates to a method in base station 120 for intercell interference coordination in a telecommunication network 100, comprising the steps of monitoring a signal on a specific uplink radio resource from a mobile station 130 served by a neighbour base station 110; detecting characteristics of a received signal from said mobile station 130; based on characteristics of said received signal, selecting transmission parameters for downlink transmissions that limit interference for the mobile station 130 from which the signal was received.

A forth embodiment of the invention relate to a base station 120 in a telecommunication network 100, said base station 120 comprises a mechanism for intercell interference coordination, said mechanism comprises a monitoring unit configured to monitor and receive a signal on a specific uplink radio resource from a mobile station 130 served by a neighbour base station 110; a detecting unit configured to detect characteristics of a received signal from said mobile station 130; a selecting unit, configured to, based on characteristics of the received signal, select transmission parameters for downlink transmissions that limit interference for the mobile station 130 from which the signal was received.

A fifth embodiment of the invention relates to a method in a mobile station 130 served by a first base station 110 for assisting intercell interference coordination in a telecommunication network 100, comprising the steps of receiving a trigger from said first base station 110 to send a signal on a specific uplink radio resource; sending said signal to be monitored by at least one neighbour base station 120, such that said neighbour base station 120, based on detected characteristics of said signal, may select transmission parameters for its downlink transmissions that limit interference for said mobile station 130.

It should be noted that the mobile station 130 is not targeting a specific base station 110, 120, but rather any base station 110, 120 that hears the signal is considered to be a neighbour base station 120 that may interfere with the mobile station 130.

A sixth embodiments of the invention relates to an arrangement in a mobile station 130 capable of communicating with base stations 110, 120 comprised in a telecommunication network 100, said mobile station 130 comprising a mechanism for assisting intercell interference coordination, said mechanism comprising a receiver configured to receive a trigger from said first base station 110 to send a signal on a specific uplink radio resource; a transmitter configured to send said signal to be monitored by at least one neighbour base station 120, such that said neighbour base station 120, based on detected characteristics of said signal, may select transmission parameters that limit interference for said mobile station 130.

It should be noted that a base station 110, 120 may have the functionalities for both triggering a mobile station 130 to transmit the signal, and for receiving said signal and using it as basis for selecting transmission resources. Such base station 110, 120 is capable of acting both as serving base station and neighbour base station, e.g. simultaneously in relation to different mobile stations 130, 140.

Thus, according to embodiments of the present invention, base stations 110, 120 trigger terminals 130, 140 they want not to be interfered to send signals on a special uplink resource. In a specific embodiment, these signals are in the form of (special) sounding signals. Neighbour base stations detect the characteristics of the signals received on the special resource, and based on this select transmission parameters that limit interference to terminals 130, 140 sending the sounding signal.

A base station 110, 120 obtains spatial information by listening to the signal from the mobile station 130, 140. By using reciprocity, the estimate from listening to uplink transmissions can be applied in the downlink as well. Thus, neighbouring base stations get the necessary information by receiving the signal from the mobile station 130.

It should be noted that only mobile stations 130 that the base station 110 wishes to limit interference may be triggered, according to some embodiments, to send the special sounding signal. This subset of mobile stations 130 may e.g. comprise mobile stations 130 to which they intend to send data to in the near future, and which are strongly interfered by neighbour base stations 120. Other mobile stations may still send sounding signals, but for other reasons and preferably on other resources.

When using the formulation "comprise" or "comprising" it is to be interpreted as non-limiting, i.e. meaning "consist at least of". The present invention is not limited to the above described preferred embodiments. Various alternatives, modifications and equivalents may be used. Therefore, the above embodiments are not to be taken as limiting the scope of the present invention, which is defined by the appending claims.

The invention claimed is:

1. A method in a first base station, for intercell interference coordination in a telecommunication network, which telecommunication network comprises the first base station, acting as a serving base station for a mobile station, and a second base station, the method comprising the actions of:

determining that transmission interference to the mobile station is to be limited, and triggering the mobile station to send a sounding signal on a radio resource, which sounding signal is to be received by the second base station, enabling the second base station to select transmission parameters that limits interference for the mobile station based on time domain averaging of the sounding signal.

2. The method according to claim 1, wherein the radio resource comprises at least one of: a certain time, frequency, and/or code.

3. The method according to claim 1, wherein the action of triggering the mobile station to send the sounding signal is performed by communicating the trigger in a downlink scheduling assignment sent to the mobile station.

4. The method according to claim 1, wherein the action of determining that transmission interference to the mobile station is to be limited, is determined based on at least one of: interference situation, Quality-of-Service parameters, traffic type, estimated transmission duration, channel quality report, and/or network load.

5. An arrangement in a first base station, for intercell interference coordination in a telecommunication network, which telecommunication network comprises the first base station, acting as serving base station for a mobile station, and a second base station, the arrangement comprising:

a determining unit, configured to determine that transmission interference to the mobile station is to be limited, and a triggering unit, configured to trigger the mobile station to send a sounding signal on a radio resource, which sounding signal is to be received by the second base station, enabling the second base station to select a transmission parameter that limits interference for the mobile station based on time domain averaging of the sounding signal.

6. A method in a second base station, for intercell interference coordination in a telecommunication network, which telecommunication network comprises the second base station and a first base station, acting as serving base station for a mobile station, the method comprising the actions of:

receiving a sounding signal on a radio resource from the mobile station, detecting a characteristic of the received sounding signal by time domain averaging of the sounding signal, and selecting a transmission parameter that limits interference for the mobile station, from which the sounding signal was received, based on the detected characteristic of the received sounding signal.

7. The method according to claim 6, wherein the action of detecting a characteristic of the received sounding signal comprises estimating at least one of: received transmission power, angle-of-arrival, frequency, and/or covariance between receive antennas.

8. The method according to claim 6, comprising the further action of:

re-selecting the transmission parameter that was used before the sounding signal was received, when a certain time period has passed from having received the sounding signal on the specific radio resource from the mobile station.

9. The method according to claim 6, wherein the transmission parameter to be selected comprises at least one of: frequency, time, transmission power, beamforming technique, and/or precoder.

10. An arrangement in a second base station, for intercell interference coordination in a telecommunication network, which telecommunication network comprises the second base station and a first base station, acting as serving base station for a mobile station, the arrangement comprising:

a receiver, configured to receive a sounding signal on a specific radio resource from the mobile station, a detecting unit, configured to detect a characteristic of the received sounding signal by time domain averaging of the sounding signal, a selecting unit, configured to select transmission parameters that limits interference for the mobile station, from which the sounding signal was received, based on characteristic of the received sounding signal.

11. A method in a mobile station, for assisting intercell interference coordination in a telecommunication network, which telecommunication network comprises a first base station, acting as serving base station for the mobile station, and a second base station, the method comprising the actions of:

receiving a trigger from the first base station to send a sounding signal on a radio resource, sending the sounding signal to be received by the second base station, enabling the second base station to select a transmission parameter that limits interference for the mobile station, based on a time domain averaging of a detected characteristic of the sounding signal.

12. An arrangement in a mobile station, for assisting intercell interference coordination in a telecommunication network, which telecommunication network comprises a first base station, acting as serving base station for the mobile station, and a second base station, the arrangement comprising:

a receiver configured to receive a trigger from the first base station to send a sounding signal on a radio resource, a transmitter configured to send the sounding signal to be received by the second base station, enabling the second base station to select a transmission parameter that limits interference for the mobile station, based on a time domain averaging of a detected characteristic of the sounding signal.

13. The arrangement in the mobile station of claim 12, wherein the receiver receives the trigger in a downlink scheduling assignment from the first base station.

14. The method according to claim 1, wherein the triggering the mobile station to send the sounding signal is performed using random access signalling.

15. The method according to claim 1, wherein the triggering the mobile station to send the sounding signal comprises the mobile station transmitting a sounding signal by semi-static Radio Resource Control (RRC) signalling in response to determining that the mobile station is scheduled in an uplink and/or a downlink channel.

16. The method according to claim 1, wherein the triggering the mobile station to send the sounding signal comprises the mobile station transmitting a sounding signal in a Cyclic Redundancy Check (CRC).

17. The method in the second base station according to claim 6, wherein the selecting the transmission parameter that limits interference for the mobile station further comprises:

determining if the mobile station is a sensitive station; and in response to determining that the mobile station is the sensitive station, selecting the transmission parameter that limits interference such that the mobile station receives reduced interference from the second base station and prioritizes communication from the serving base station.

18. The method in the second base station according to claim 17, wherein the determining if the mobile station is the sensitive station comprises identifying that the mobile station is associated with emergency personnel and/or premium subscribers.

\* \* \* \* \*